US011385373B2

(12) United States Patent
Hampson

(10) Patent No.: US 11,385,373 B2
(45) Date of Patent: Jul. 12, 2022

(54) METHOD FOR DETERMINING SENSOR DEPTHS AND QUALITY CONTROL OF SENSOR DEPTHS FOR SEISMIC DATA PROCESSING

(71) Applicant: DownUnder GeoSolutions Pty Ltd., Perth (AU)

(72) Inventor: Gary Hampson, Peppermint Grove (AU)

(73) Assignee: DownUnder GeoSolutions Pty Ltd., Perth (AU)

(*) Notice: Subject to any disclaimer, the term of this patent is extended or adjusted under 35 U.S.C. 154(b) by 800 days.

(21) Appl. No.: 16/243,496

(22) Filed: Jan. 9, 2019

(65) Prior Publication Data
US 2019/0146112 A1 May 16, 2019

Related U.S. Application Data

(63) Continuation of application No. PCT/US2017/040785, filed on Jul. 6, 2017.

(60) Provisional application No. 62/360,655, filed on Jul. 11, 2016.

(51) Int. Cl.
*G01V 1/36* (2006.01)
*G01V 1/38* (2006.01)

(52) U.S. Cl.
CPC ............ *G01V 1/3835* (2013.01); *G01V 1/366* (2013.01); *G01V 2210/56* (2013.01)

(58) Field of Classification Search
CPC ... G01V 1/366; G01V 1/3835; G01V 2210/56

USPC .......................................................... 367/21
See application file for complete search history.

(56) References Cited

U.S. PATENT DOCUMENTS

| | | |
|---|---|---|
| 2010/0135113 A1 | 6/2010 | Cambois |
| 2010/0211321 A1 | 8/2010 | Ozedmir et al. |
| 2013/0028049 A1 | 1/2013 | Pan |
| 2013/0322208 A1 | 12/2013 | Soliner et al. |
| 2016/0139283 A1 | 5/2016 | Kamil et al. |

OTHER PUBLICATIONS

United Kingdom Examination Report dated Mar. 26, 2021 for United Kingdom Application No. GB 1902042.9.
International Search Report, International Application No. PCT/US2017/040785.
Written Opinion of the International Search Authority, International Application No. PCT/US2017/040785.
Australian Examination Report dated Oct. 23, 2019, for Australian Application No. 2017295827.

*Primary Examiner* — Daniel L Murphy
(74) *Attorney, Agent, or Firm* — Richard A. Fagin

(57) ABSTRACT

A method for determining seismic sensor depths in a body of water includes accepting as input to a computer measurements of seismic signals made by a plurality of seismic sensors disposed in a body of water. A depth increment and a range of sensor depths for correlation of signals from each of the plurality of seismic sensors is defined. In the computer, the input seismic measurements are extrapolated to each depth increment in the range. A depth of each seismic sensor is determined by correlating the seismic signal measurements with depth-extrapolated measurements of the seismic signal measurements.

25 Claims, 7 Drawing Sheets

US 11,385,373 B2

METHOD FOR DETERMINING SENSOR DEPTHS AND QUALITY CONTROL OF SENSOR DEPTHS FOR SEISMIC DATA PROCESSING

CROSS REFERENCE TO RELATED APPLICATIONS

Continuation of International (PCT) Application No. PCT/US2017/040785 filed on Jul. 6, 2017. Priority is claimed from U.S. Provisional Application No. 62/360,655 filed on Jul. 11, 2016. Both the foregoing two applications are incorporated herein by reference in their entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of seismic surveying. More specifically the disclosure relates to seismic surveying for the purpose of geophysical exploration.

Geophysical exploration for and exploitation of subsurface hydrocarbon reserves includes reflection seismic surveying. Reflection seismic surveys can be acquired both onshore (land) and offshore (marine). In a marine seismic survey one or more streamers, a streamer being a long cable containing seismic sensors or linear arrays of sensors spaced regularly along its length, are towed behind a boat at a selected depth below the water surface. A seismic source or sources, typically one or more air gun arrays, may also towed directly behind the boat or by another vessel, also at a selected depth below the water surface. The seismic source when actuated generates an acoustic signal that propagates through the water column (the distance in the water between the surface and the water bottom) and into the geological strata (formations) below the water bottom. The acoustic signal is refracted and reflected by acoustic impedance boundaries, e.g., at boundaries between the various formation layers, travelling back upwardly where it is ultimately detected by the sensors or sensor arrays in the streamer. A linear array of sensors may include a selected number of seismic sensors spaced apart from each other at a relatively small distance (e.g., ¼ of the shortest wavelength of seismic energy detected in the acoustic signal) and the output of such sensors may be combined electrically or otherwise to produce a single detected signal that has reduced effects of horizontally propagating noise.

The seismic source is typically actuated at selected time intervals (each actuation being called a "shot") as the boat travels along a survey line or "sail line." Each sensor or array of sensors detects upwardly traveling (i.e., reflected and/or refracted) signals and the detected signals are recorded with respect to time. The recording time may be referenced or indexed, e.g., to the actuation time of the seismic source. Such signal recording produces a single seismic "trace" for each sensor or array of sensors. A collection of recorded traces from all sensors or sensor arrays along a single streamer is called a shot record. A seismic survey is made up of a plurality of shot records recorded along a single sail line or many parallel sail lines covering a selected area of the subsurface. Raw (pre-stack) shot records undergo sophisticated processing in order to create a final (post-stack) seismic volume for interpretation of geophysical characteristics of the subsurface formations.

An objective of seismic surveying is to record the response of the earth to imparted seismic signals. As the need to characterize thinner and more complex geologic structures, e.g., hydrocarbon reservoirs increases so too does the demand for high-resolution seismic data. Vertical resolution is related to bandwidth, or the range of frequencies that are present in the detected seismic signals. Many parameters related to the acquisition and the physics of the propagating acoustic signal act to limit the bandwidth that can be detected by the sensors and recorded.

A well-known factor that limits bandwidth in marine seismic acquisition relates to reflections from the water surface (air/water interface). Acoustic signals travelling upwardly in the water layer will be reflected with opposite polarity from the air/water interface. Such reflected signals are termed "ghost" reflections. The sensors in the streamer record, for each shot, not only the desired "primary reflection" wave field, i.e., a single, upwardly traveling wave field representing reflections of the original seismic signal from subsurface acoustic impedance boundaries, but also the ghost reflections. Ghost reflections destructively interfere with the primary reflection of interest resulting in "notches" in the spectrum of the detected acoustic signal at particular frequencies. These notches limit the useable bandwidth of the seismic data and are thus undesirable. Methods known in the art for reducing the effect of ghost reflections are termed "deghosting."

Deterministic deghosting methods known in the art require an accurate description of the reflectivity function of the free surface and require accurate knowledge of the source and sensor depths. Methods to check the quality of determined sensor depths are therefore desired.

DETAILED DESCRIPTION

Figure 1:
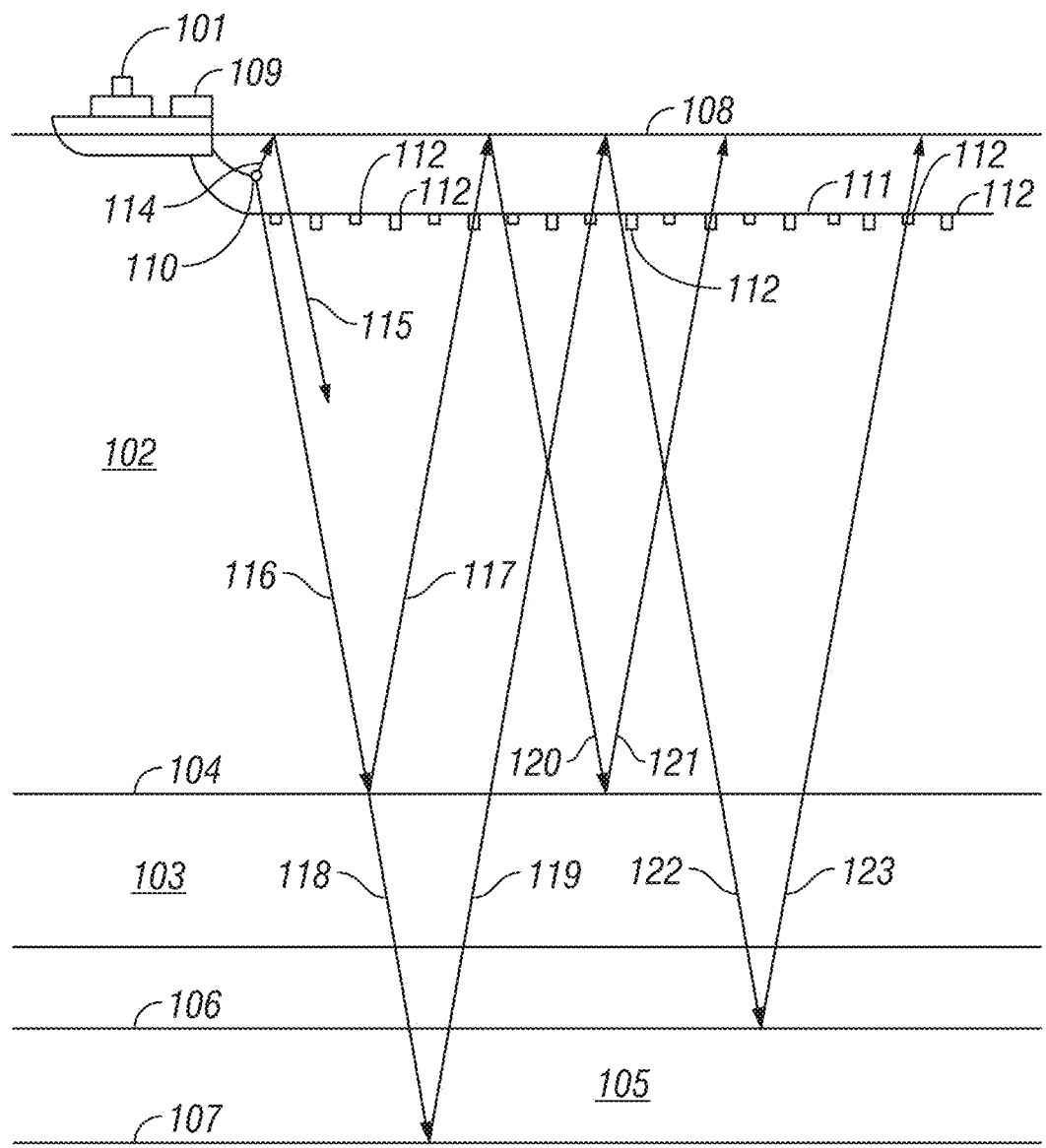
FIG. 1 shows an example of marine seismic data acquisition.

FIG. 1 shows an example of a system and method for acquiring marine seismic data that can be used with methods according to the present disclosure. A seismic vessel 101 moves along the surface 108 of a body of water 102 above a portion 103 of the subsurface that is to be surveyed. Beneath the water bottom 104, a portion 103 of the subsurface contains formations of interest such as a layer 105 positioned between an upper boundary 106 and lower boundary 107 thereof. The seismic vessel 101 contains seismic acquisition control equipment, designated generally at 109. The seismic acquisition control equipment 109 includes navigation control, seismic energy source control, seismic sensor control, and signal recording equipment, all of which can be of types well known in the art.

The seismic acquisition control equipment 109 causes a seismic source 110 towed in the body of water 102 by the seismic vessel 101 (or by a different vessel) to actuate at selected times. The seismic source 110 may be of any type well known in the art of seismic acquisition, including air guns or water guns, or particularly, arrays of air guns. Seismic streamers 111 are also towed in the body of water 102 by the seismic vessel 101 (or by a different vessel) to detect the acoustic wave fields initiated by the seismic source 110 and reflected from interfaces in the environment. Although only one seismic streamer 111 is shown in FIG. 1 for illustrative purposes, typically a plurality of laterally spaced apart seismic streamers 111 are towed behind the seismic vessel 101. The seismic streamers 111 contain sensors to detect the reflected wave fields initiated by the seismic source 110. In the present example the seismic streamers 111 contain pressure responsive sensors such as hydrophones 112. The hydrophones 112 are typically disposed in multiple sensor arrays at regular intervals along the seismic streamers 111. However, the type of sensors and their particular locations along the seismic streamers 111 are not intended to be limitations on the present disclosure.

Each time the seismic source 110 is actuated, an acoustic wave field travels in spherically expanding wave fronts. The propagation of the wave fronts will be illustrated herein by ray paths which are perpendicular to the wave fronts. An upwardly traveling wave field, designated by ray path 114, will reflect off an air/surface interface, i.e., the water-air interface at the water surface 108 and then travel downwardly, as in ray path 115, where the wave field may be detected by the hydrophones 112 in the seismic streamers 111. Such a reflection from the water surface 108, as in ray path 115 contains no useful information about the subsurface formations of interest. However, such surface reflections, also known as ghosts, act as secondary seismic sources with a time delay from initiation of the seismic source 110.

The downwardly traveling wave field, in ray path 116, will reflect off the earth-water interface at the water bottom 104 and then travel upwardly, as in ray path 117, where the wave field may be detected by the hydrophones 112. Such a reflection at the water bottom 104, as in ray path 117, contains information about the water bottom 104. Ray path 117 is an example of a "primary" reflection, that is, a reflection originating from a boundary in the subsurface. The downwardly traveling wave field, as in ray path 116, may transmit through the water bottom 104 as in ray path 118, reflect off a layer boundary, such as 107, of a layer, such as 105, and then travel upwardly, as in ray path 119. The upwardly traveling wave field, ray path 119, may then be detected by the hydrophones 112. Such a reflection off a layer boundary 107 contains useful information about a formation of interest 105 and is also an example of a primary reflection.

The acoustic wave fields will continue to reflect off interfaces such as the water bottom 104, water surface 108, and layer boundaries 106, 107 in combinations. For example, the upwardly traveling wave field in ray path 117 will reflect off the water surface 108, continue traveling downwardly in ray path 120, may reflect off the water bottom 104, and continue traveling upwardly again in ray path 121, where the wave field may be detected by the hydrophones 112. Ray path 121 is an example of a multiple reflection, also called simply a "multiple", having multiple reflections from interfaces. Similarly, the upwardly traveling wave field in ray path 119 will reflect off the water surface 108, continue traveling downwardly in ray path 122. Such reflected energy as in ray path 122 may be detected by one or more of the hydrophones 112, thus creating a ghost referred to as a "sensor side ghost", the effects of which on the desired seismic signal are similar in nature to the previously described ghost. The seismic energy may reflect off a layer boundary 106 and continue traveling upwardly again in ray path 123, where the wave field may be detected by the hydrophones 112. Ray path 123 is another example of a multiple reflection, also having multiple reflections in the subsurface.

Methods according to the present disclosure were developed with a an objective being able to determine and quality control check sensor depths below the water surface for seismic data processing applications, in particular, but not limited to, deghosting. While the following description is made in terms of marine seismic data acquisition, the methods disclosed herein are is equally applicable to land acquisition of seismic data. In methods according to the present disclosure used in connection with land-based surveys, the air/surface interface may be the land surface (with the air above the surface). One or more seismic energy sources may be disposed at the surface, or, for example, in one or more wellbores drilled to a selected depth below the land surface. Similarly, the seismic sensors may be buried at a selected depth below the surface, or may be deployed in one or more spaced apart wellbores at a selected depths or within a selected range of depths below the land surface.

In this disclosure a method is described which bears similarities with methods described in King and Poole (2015), however, no vertical ray approximation is required as it is in methods according to such publication. Methods according to the present disclosure provide accurate sensor depths for arbitrary streamer depths and in principle will work for all offsets (horizontal distance between seismic source and any individual seismic sensor or sensor array).

It will be shown that methods according to the present disclosure may be used in at least two different ways and that depth determination may be performed before deghosting. After deghosting, an assessment of optimum deghosting parameters may be performed using various metrics.

The present disclosure will begin from a review of the forward ghost model.

1. The Forward Ghost Model

Figure 2:
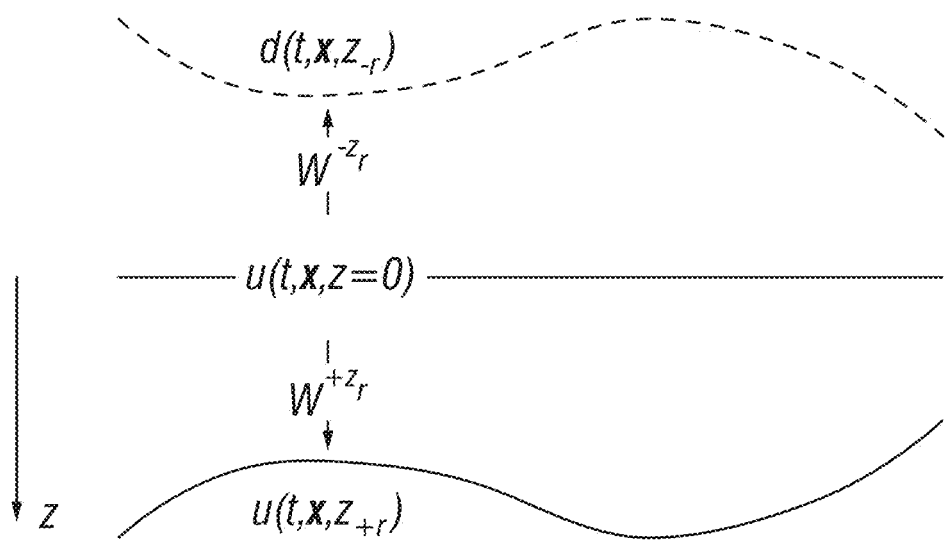
FIG. 2 shows extrapolated up-going and down-going wavefields.

Consider an upwardly travelling (up-going) scalar wavefield, $u(t,x,z=0)$ in a homogeneous whole-space (the horizontal space vector is given by, x, which may contain one or two dimensions, time is denoted, t, and z is depth below, e.g., the water surface. The upgoing scalar wavefield is the wavefield to be determined. The wavefield that would have been detected by a plurality of spaced apart seismic sensors arranged at depths, $z_r(x)$ in a body of water may be expressed as:

$$u(t,x,z_r(x)) = u(t,x,z=0) * W^{+z_r} \quad (1)$$

in which $W^{+z_r}$ is a one way wave extrapolator to downward extrapolate an up-going wavefield across the depth interval $0 \to z_r$ and the symbol * denotes convolution in 1, 2 or 3 dimensions. In other words, the foregoing operator in Eq. (1) is a depth extrapolation of a time-dependent scalar wavefield. The foregoing operator reduces the time of seismic events in a wave-consistent manner. Eq. (1) describes the up-going component of the wavefield that is detected and recorded by seismic sensors (see FIG. 1). Similarly one may also consider what wavefield would have been observed by the mirror or virtual image of the seismic sensors with $z_{-r}(x) = -z_r(x)$. If r represents the free-surface reflectivity (e.g., the reflectivity at the air/water boundary at the water surface), the mirrored or virtual sensors would detect a wavefield represented by the expression:

$$d(t,x,z_{-r}) = ru(t,x,z=0) * W^{-z_r} \qquad (2)$$

which is the down-going or the ghost component of the detected seismic wavefield. The operator $W^{-z_r}$ is an upward extrapolation of an up-going wavefield across the depth interval $0 \to Z_{-r}$. The foregoing operator of Eq. (2) increases the times of seismic events in a wave consistent manner. These wave-fields are shown in FIG. 2.

Superposition of the foregoing two components results in the detected and recorded seismic wavefield:

$$p(t,x,z_r) = u(t,x,z_r) + d(t,x,z_{-r}) = \{W^{+z_r} + rW^{-z_r}\} * u(t,x,z=0). \qquad (3)$$

The foregoing expression is the physical basis of ghosting and deghosting. All known physically-based deghosting methods solve the above equation for $u(t,x,z=0)$ in a variety of domains. Approximations rely on some form of a reduced dimensional version or on locally constant parameters.

The operators $W^{+z_r}$ and $W^{-z_r}$ may be referred to as redatuming operators or wave extrapolation operators. The foregoing redatuming operators may be expressed in one, two or three dimensions (1D, 2D or 3D). In 1D the wave extrapolation operators represent values of time delay. In 2D and 3D the operators represent plane-wave dependent time delays. The foregoing redatuming operators may be applied in a variety of domains, each with corresponding advantages and disadvantages.

2. Wave Equation Autocorrelation

Eq. (3) may be rewritten in the discrete notation of linear algebra, where upper case bold symbols represent matrices and lower case bold symbols denote column vectors:

$$(W^{+z_r} + rW^{-z_r})u = p \qquad (4)$$

By applying a wave extrapolator to upwardly extrapolate an up-going wavefield by a distance h, the following expression may be determined.

$$W^{-h}(W^{+z_r} + rW^{-z_r})u = W^{-h}p \qquad (5)$$

Figure 3:
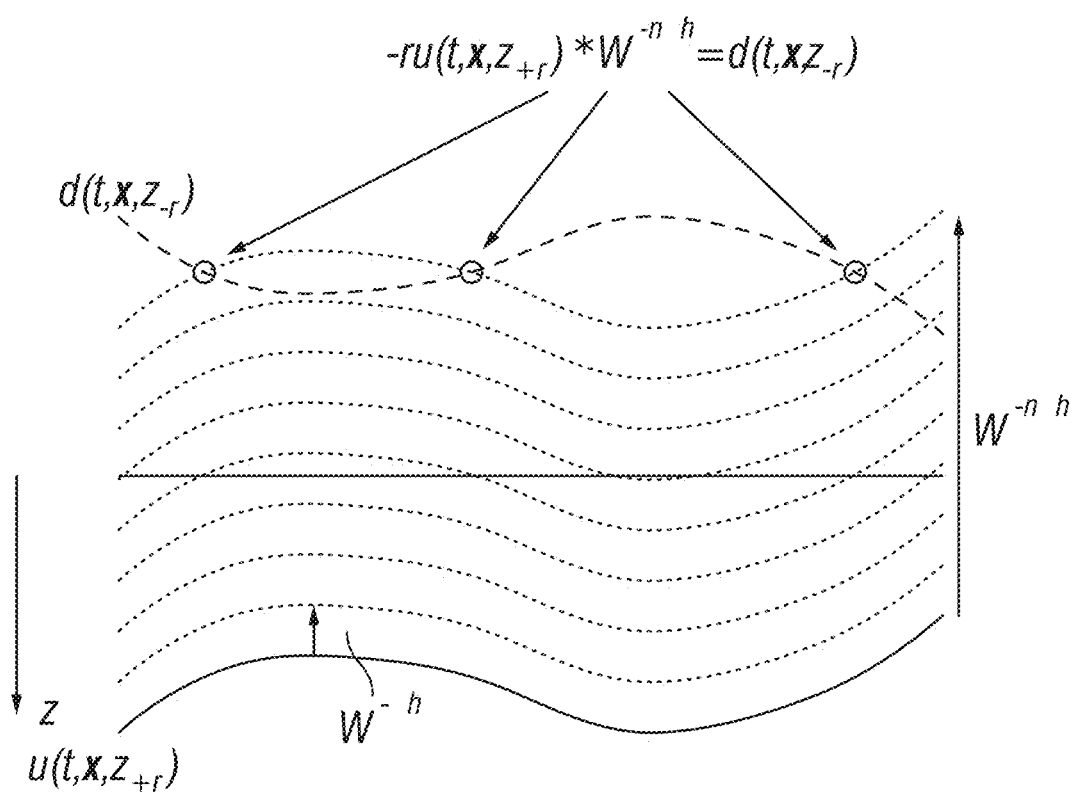
FIG. 3 shows one way in which the up-going wavefield may be upwardly continued and depicts its coincidence with the down-going wavefield of unprocessed measured seismic data.

In the specific case that $h = 2z_r$, Eq. (5) becomes:

$$W^{-2z_r}(W^{+z_r} + rW^{-z_r})u = (W^{-z_r} + rW^{-3z_r})u = W^{-2z_r}p \qquad (6)$$

which has delayed the up-going wavefield so that it aligns with the ghost component (i.e., that component reflected from the water surface) of the wavefield in the unprocessed measured seismic data. The foregoing shows that by performing wave extrapolation with a range of values for h it may be possible to find a negative correlation between the extrapolated data and the input (unprocessed measured data—see FIG. 1) when $h = 2z_r$. Note that $dz_r/dh = 1/2$. This is the wave extrapolation equivalent of autocorrelation, in which the lag is a depth lag, h, rather than a time lag. It is in principle valid for arbitrary streamer (seismic sensor) depth profiles (assuming the streamer is a conventional one as shown in FIG. 1 with a plurality longitudinally spaced apart seismic sensors or sensor arrays) and offsets. FIG. 3 shows one way in which the up-going wavefield may be upwardly continued and depicts its coincidence with the down-going wavefield of unprocessed measured seismic data.

Seismic data acquired as shown, for example, in FIG. 1 is typically recorded in digital form, and thus the output of each seismic sensor or sensor array may be digitized, i.e., converted to a set of number pairs wherein one number represents the time (usually indexed to the actuation time of the source) and the other represents signal amplitude. Assuming appropriate digital data sampling practices, i.e., a sufficiently high digital sample rate is used to digitize the detected seismic signals, correlation troughs may be picked or determined to very high precision. The wave equation based autocorrelation may also be Fourier transformed to the wavenumber-offset domain $k_x$, x and the locations of the notches directly observed at each offset.

When $n\Delta h = 2z_r(x)$ the above equations (4), (5), and (6) represent the wave equation equivalent of autocorrelation.

There are potentially other ways in which a wave equation method may be used.

Figure 4:
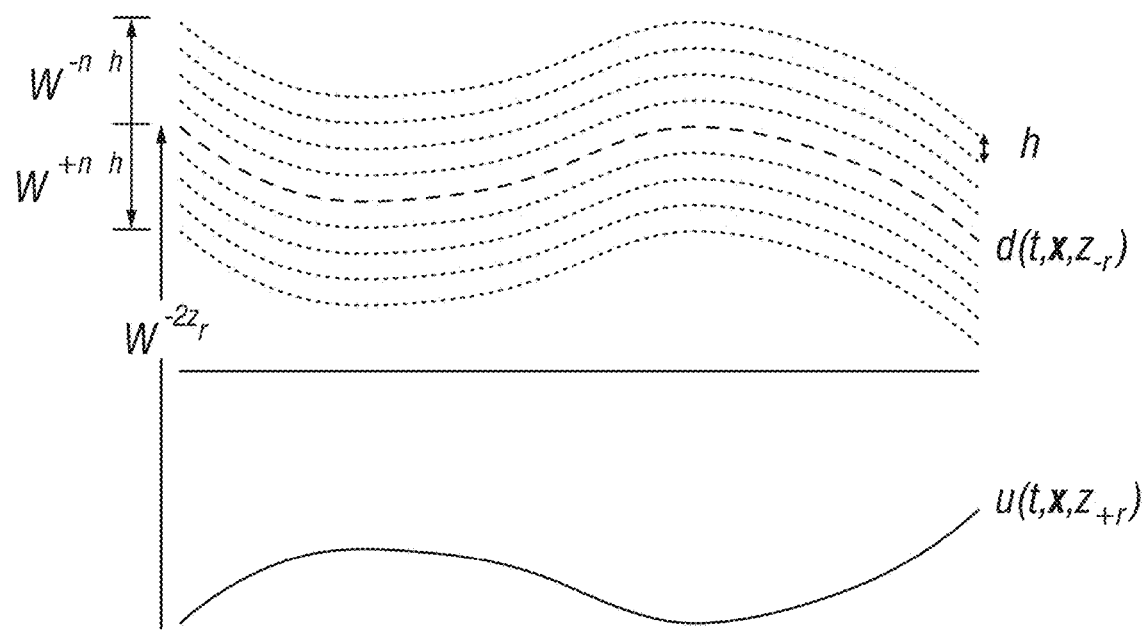
FIG. 4 shows initially upward propagation of the wavefield continues to $z(x)=-z_r(x)$, and then a scan is performed over a range of depths in the vicinity of $z(x)=-z_r(x)$. The scan may be performed in discrete increments of depth.

In another embodiment, for example, initially upward propagation of the wavefield continues to $z(x) = z_r(x)$, and then a scan is performed over a range of depths in the vicinity of $z(x) = -z_r(x)$. The scan may be performed in discrete increments of depth. In this way the results can be focused around the expected depths of interest, $z(x) = -z_r(x) \pm n\Delta h$. This concept is illustrated in FIG. 4.

In the present embodiment it can be observed that detection of the negative correlation trough would be an effective application, whereas determining various dispersion metrics would be less easily accomplished.

3. Uses of the Wave Equation Autocorrelation

There are a number of different ways in which autocorrelation can be used to help determine appropriate parameters for deghosting.

A. Before Deghosting

In the case that the bandwidth of the seismic data is sufficient to avoid interference that would distort the location of the correlation trough, the correlation may be used to detect $z_r$ by picking the correlation trough location. If suitable digital sampling has been used in the construction of the autocorrelation, then the correlation trough may be located to arbitrarily high precision using appropriate interpolation methods, including, but not limited to, interpolation by trigonometric methods. The detection of $z_r$ is shown later in an example.

B. After Deghosting

As has been disclosed in Grion et al (2015), autocorrelation may be used to detect how well a particular set of deghosting parameters has performed. Negative correlation of the ghost should ideally be perfectly removed by deghosting. Metrics that may be used on the autocorrelation to detect how well the deghosting has been performed include, without limitation:

L2 norm (energy);
L1 norm (sparseness/simplicity);
Standard deviation (a measure of energy concentration); and
Kurtosis (peakiness) (See, Grion et al (2015)).

Using one or more metrics on the autocorrelation enables a range of parameters to be used as input and the results evaluated. The first three example metrics listed above typically require minimizing the parameter value or a cost function based on the parameter value, while the Kurtosis requires maximising. One or a mixture of these metrics may be used.

4. Wave Extrapolation

There are a number of ways in which the foregoing depth extrapolations of time dependent scalar wavefields may be performed which include, but are not limited to:

f-x domain finite difference;
f-k domain phase shift;
f-x domain Kirchhoff migration;
t-x domain Kirchhoff migration;
f-p domain phase shift; and
r-p domain time shift.

A number of the foregoing operators have been tested, and it has been determined that f-p domain phase shift operators work well and have a number of advantages such as handling irregular sensor spacing and having high quality boundary effects. However, other operators may be used for various purposes.

5. Depth Sampling

Preferably the depth samples in the depth scan are fine (closely spaced) enough to satisfy sampling theory, but not so fine as to create more computational burden than is necessary. The maximum temporal frequency of the input seismic data, $1/2\Delta t$, may be fully represented in the autocorrelation function. Since it is desirable that the depth sampling is equivalent to the depth equivalent of $\Delta t$, then the depth increments in the wave extrapolation may be $\Delta h = v\Delta t$. Recall, however, that because $dz_r/dh=1/2$, this is equivalent to:

$$\Delta z_r = \frac{v\Delta t}{2} \quad (7)$$

which is the sample interval in terms of sensor depth for the autocorrelation.

6. Limitations

If the bandwidth of the detected and recorded seismic data is insufficient to prevent the location of the negative correlation trough from being distorted, the detected depths will be distorted.

7. Field Example

Figure 5:
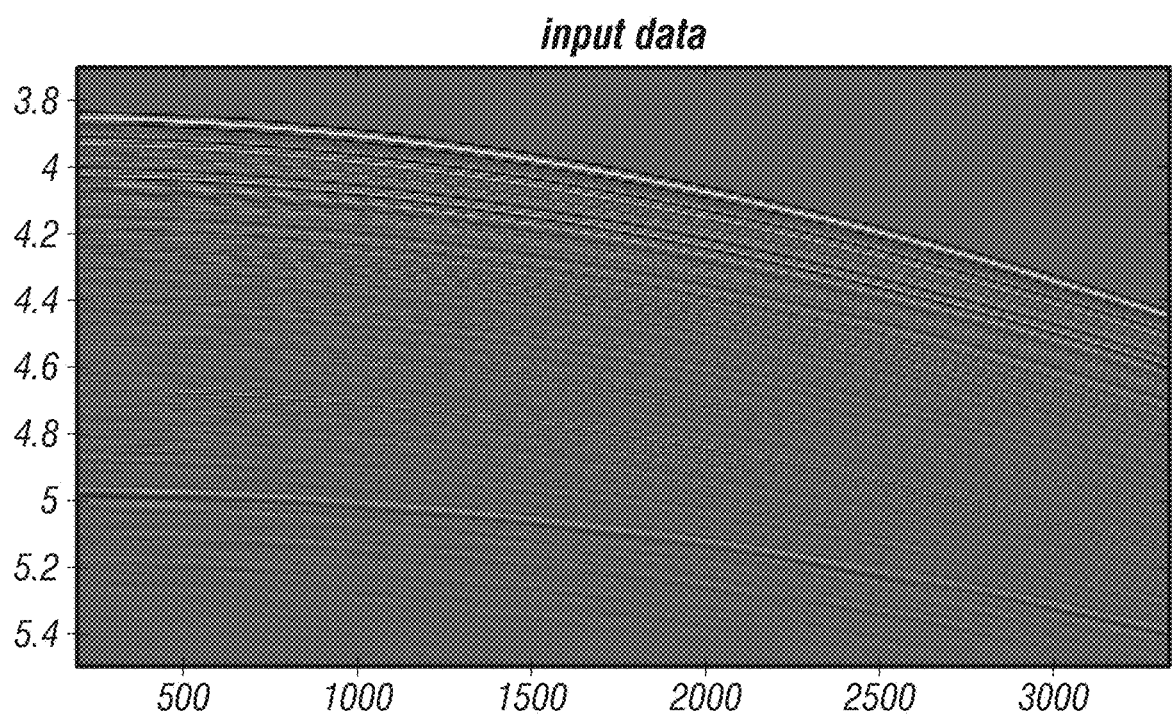
FIG. 5 shows a shot record used for an example embodiment of a method according to the present disclosure.
Figure 6:
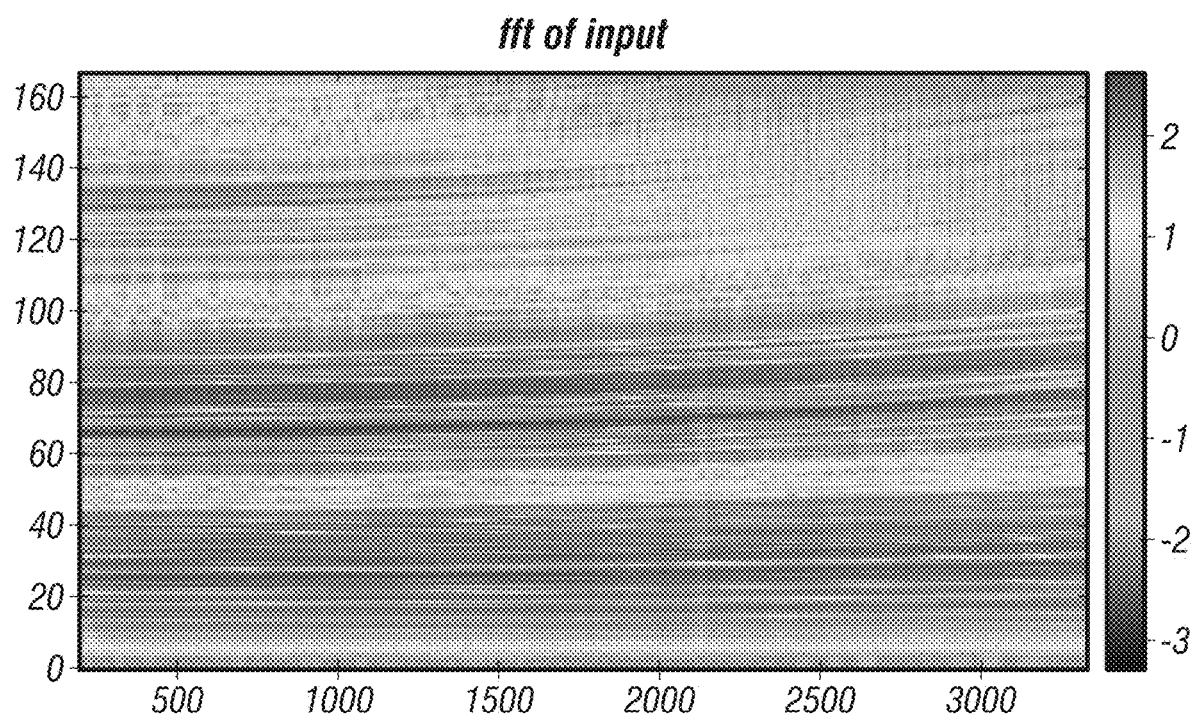
FIG. 6 shows the amplitude spectrum of the f-x-transform of the data record in FIG. 5.

FIG. 5 shows a shot record used for an example embodiment of a method according to the present disclosure. The seismic sensors (FIG. 1) are nominally disposed at a depth of 15 meters. The amplitude spectrum of the f-x-transform of the data record in FIG. 5 is shown in FIG. 6 where the ghost notches are quite clearly observable but they change with offset and dip.

Figure 7:
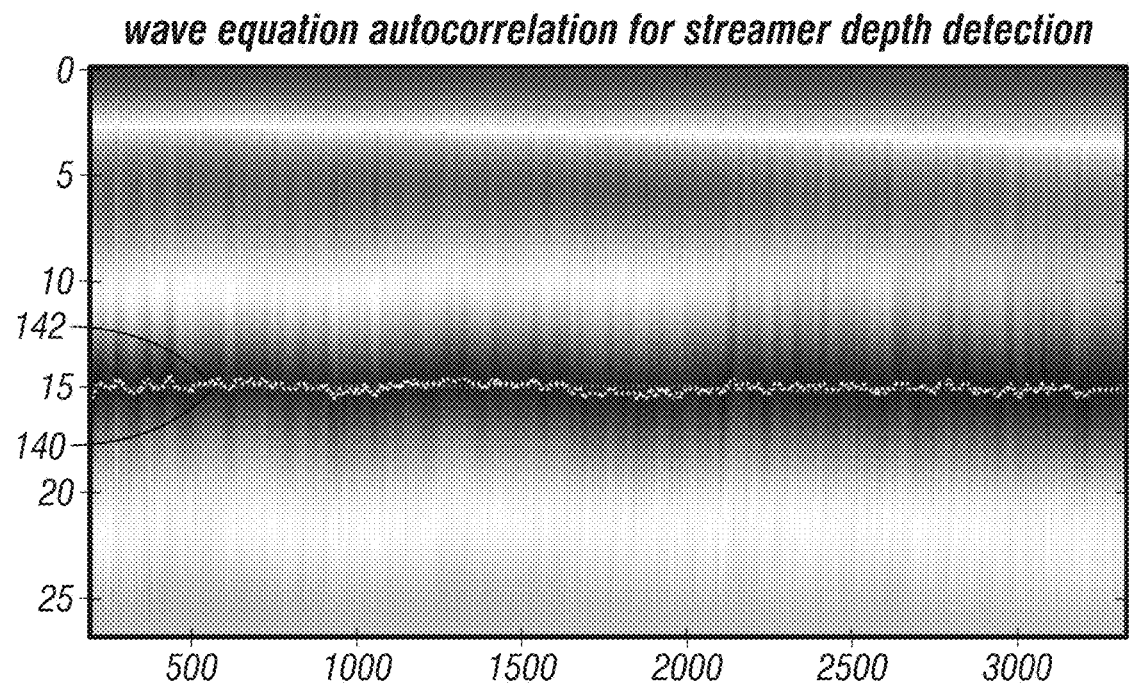
FIG. 7 shows the result of performing the wave equation autocorrelation. Positive lags from 0-26 meters sensor depth equivalent are displayed.

FIG. 7 shows the result of performing the wave equation autocorrelation. Positive lags from 0-26 meters sensor depth equivalent are displayed. The sensor depths taken from the trace headers are plotted as discrete points indicated by numeral 140. The locations of the troughs' minima are also shows as discrete points at reference numeral 142. It may be interpreted that fluctuations in the trough picks relates to fluctuations in the height of the free (water) surface.

Figure 8:
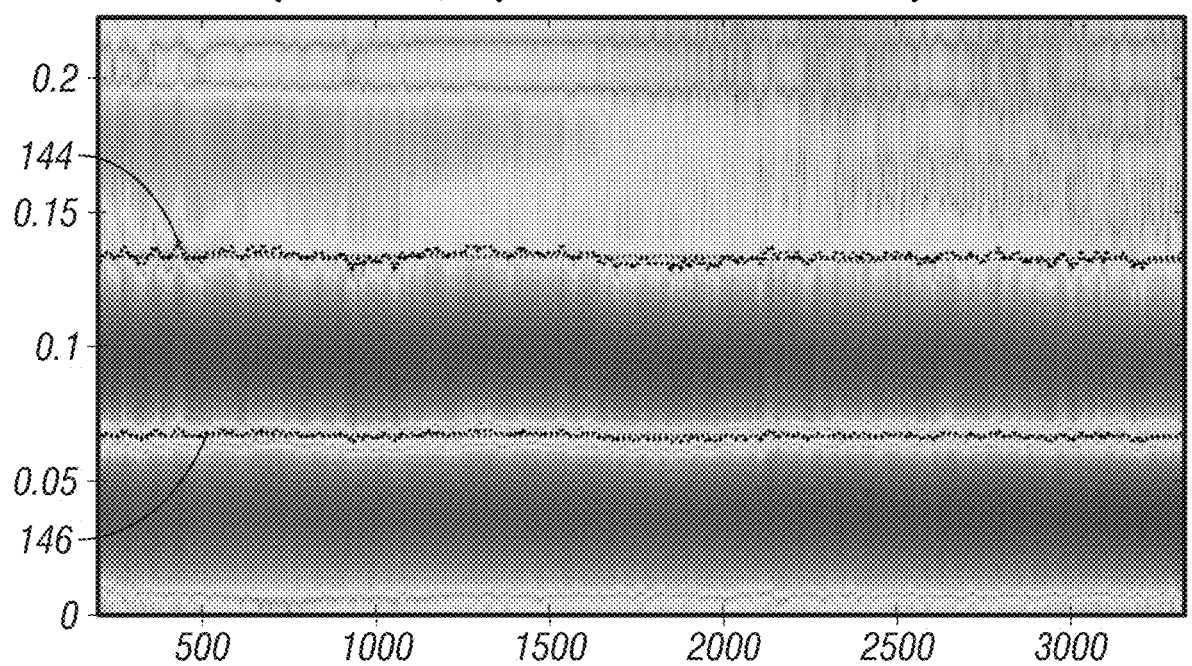
FIG. 8 shows the $k_z$-x spectrum of the autocorrelation.

FIG. 8 shows the $k_z$-x spectrum of the autocorrelation. The locations of the notches from the headers are shown at the top of the figure. The locations picked from the autocorrelation are shown at 144 and 146. There appears to be good notch representation determined in the $k_z$-x domain. FIG. 8 may also be compared to FIG. 6 to illustrate the absence of the effects of dip in the present example method.

Figure 9:
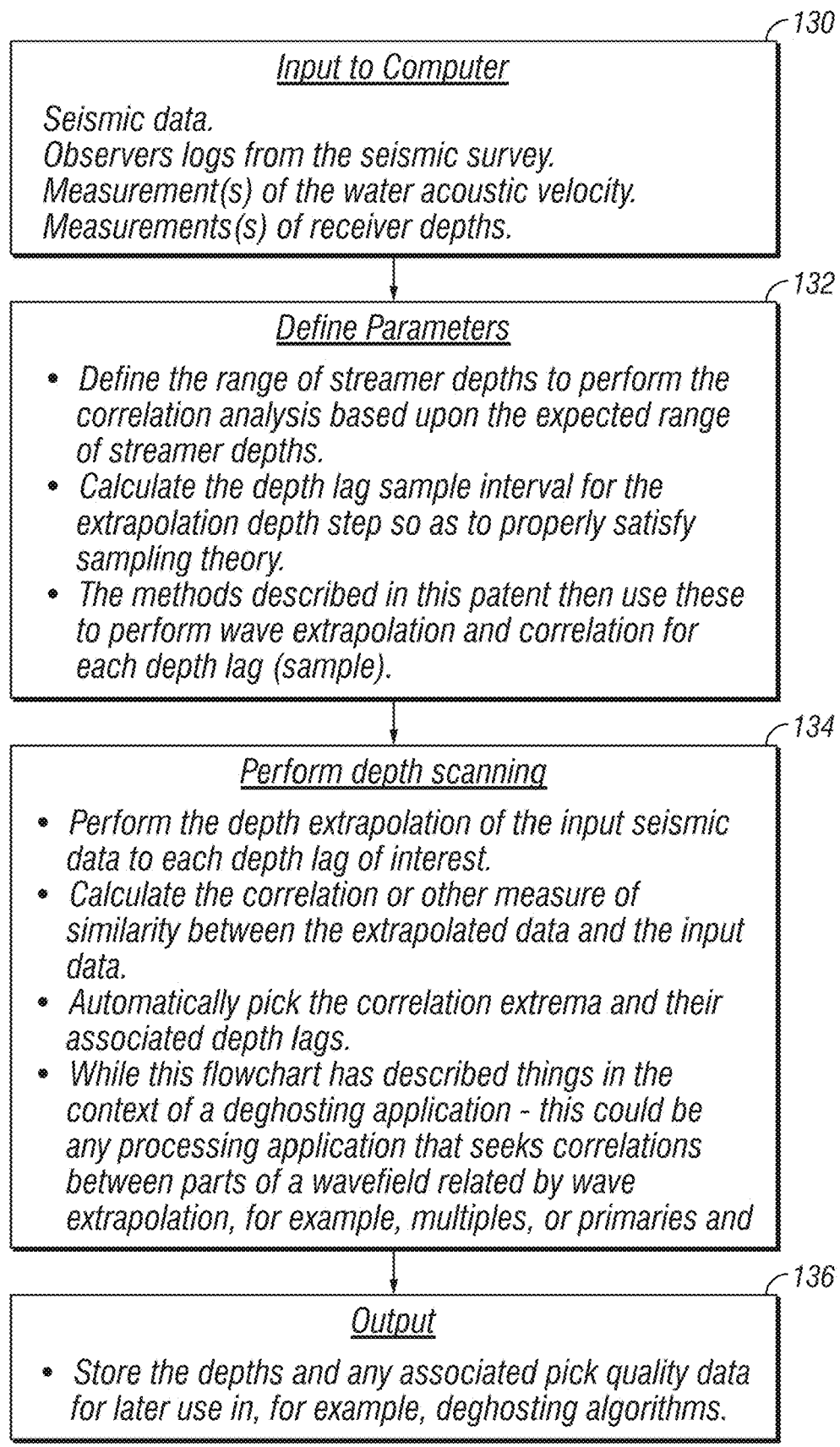
FIG. 9 shows a flow chart of an example implementation of a method according to the present disclosure.

FIG. 9 shows a flow chart of an example embodiment of sensor depth determination according to the present disclosure. At 130, acquired data may be input to a computer or computer system (see FIG. 10). The input data may include measured seismic data (FIG. 1), observers' logs from the seismic survey, measurement(s) of the water acoustic velocity and measurement(s) of seismic sensor depths. Seismic sensor depths may be measured, for example using a pressure sensor associated with each seismic sensor, or in the case where the seismic sensors (112 in FIG. 1) are absolute pressure hydrophones rather than pressure time gradient hydrophones, the DC component of the seismic sensor measurements may be used to measure sensor depth.

At 132, a range of seismic sensor depths over which to perform the correlation analysis based upon an expected range of sensor depths may be defined. The depth lag sample interval for the extrapolation depth increment may be defined so as to properly satisfy sampling theory. The range of sensor depths may be estimated based on, for example, measurements of sensor depths made using, e.g., pressure sensors, or depths to which the streamers are moved using lateral force and depth (LFD) control devices coupled into the streamers. One example of such LFD device is described in U.S. Pat. No. 6,144,342 issued to Bertheas et al.

The methods described above may then use the range of depth lags and depth lag sample interval to perform wave extrapolation and correlation for each depth lag sample.

At 134, the depth extrapolation of the input seismic data to each depth lag of interest (i.e., to each depth in the range of depths defined at 132) is performed. The correlation or other measure of similarity between the extrapolated data and the input seismic data is calculated for each depth at each sensor within the defined range of depths. Then the correlation extrema and their associated depth lags are automatically selected by the computer or computer system.

At 136, the depths associated with correlation extrema (at 134) and any associated selection quality data for later use in, for example, deghosting procedures. The depths determined by correlation extrema (at 134) may be used in to quality check the results of the depths input at 130, for example, measured depths.

In principle there is no reason why methods according to the present disclosure could not be applied to the determination and quality control of source depths. Such application would work best when the sources were deeper in the water than the seismic sensors so the correlation had no interference. Using reciprocity one may simply replace the sensors for seismic sources and all the previous derivations are still valid.

It is possible to provide other types of depth determination that would also work with a method according to the present disclosure. For example, one may determine the water depth for use in water layer multiple reflection attenuation applications. In this regard the wave equation autocorrelation could be used to match primary reflections to multiple reflections. The method may also be used to perform trim adjustments to a given multiple model in order to optimize them for further processing.

Figure 10:
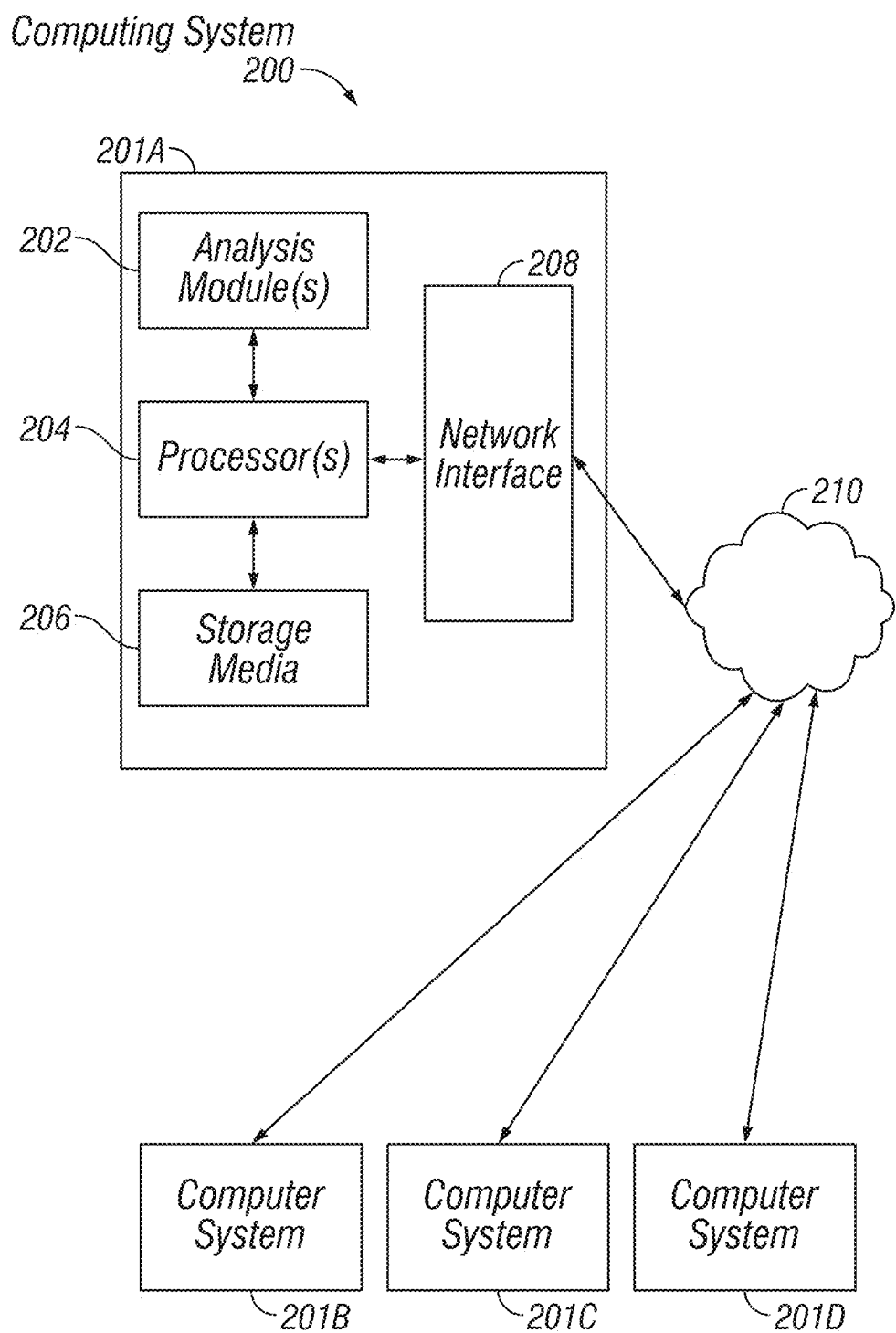
FIG. 10 shows an example computer system that may be used in some embodiments.

All of the above processing may be performed in any general purpose or purpose specific computer or processor. FIG. 10 shows an example computing system 200 in accordance with some embodiments. The computing system 200 may be an individual computer system 201A or an arrangement of distributed computer systems. The individual computer system 201A may include one or more analysis modules 202 that may be configured to perform various tasks according to some embodiments, such as the tasks explained with reference to FIGS. 2-9. To perform these various tasks, the analysis module 202 may operate independently or in coordination with one or more processors 204, which may be connected to one or more storage media 206. A display device 205 such as a graphic user interface of any known type may be in signal communication with the processor 204 to enable user entry of commands and/or data and to display results of execution of a set of instructions according to the present disclosure.

The processor(s) 204 may also be connected to a network interface 208 to allow the individual computer system 201A to communicate over a data network 210 with one or more additional individual computer systems and/or computing systems, such as 201B, 201C, and/or 201D (note that computer systems 201B, 201C and/or 201D may or may not share the same architecture as computer system 201A, and may be located in different physical locations, for example, computer systems 201A and 201B may be at a well drilling location, while in communication with one or more computer systems such as 201C and/or 201D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 206 may be implemented as one or more computer-readable or machine-readable storage media. Note that while in the example embodiment of FIG. 10 the storage media 206 are shown as being disposed within the individual computer system 201A, in some embodiments, the storage media 206 may be distributed within and/or across multiple internal and/or external enclosures of the individual computing system 201A and/or additional computing systems, e.g., 201B, 201C, 201D. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 200 is only one example of a computing system, and that any other embodiment of a computing system may have more or fewer components than shown, may combine additional components not shown in the example embodiment of FIG. 10, and/or the computing system 200 may have a different configuration or arrangement of the components shown in FIG. 10. The various components shown in FIG. 10 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, GPUs, coprocessers or other appropriate devices. These modules, combinations of these modules, and/or their combination with general hardware are all included within the scope of the present disclosure.

Publications referred to in the present disclosure include the following:

Laws, Robert and Kragh, Ed, 2006, *Sea surface shape derivation above the seismic streamer*, Geophysical Prospecting, 54, 817-828.

Hardwick, A., Charron, P., Masoomzadeh, H., Aiyepeku, A., Cox, P., and Laha, S., 2015, *Accounting for sea surface variation in deghosting—a novel approach applied to a 3D dataset offshore west Africa.*, SEG Annual meeting Grion, S., Telling, R., and Barnes, J., 2015, *Adaptive De-ghosting by Kurtosis,* 77th EAGE Conference and Exhibition 2015.

King, Simon, and Poole, Gordon, 2015, *Hydrophone-only sensor deghosting using a variable sea surface datum.* SEG Technical Program Expanded Abstracts 2015: pp. 4610-4614.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for determining seismic sensor depths below an air/surface interface, comprising:
   accepting as input to a computer measurements of seismic signals made by a plurality of seismic sensors disposed at selected depths below the air/surface interface, the seismic signals resulting from actuation of a seismic energy source disposed at a selected depth with reference to the air-surface interface;
   defining a depth increment and a range of sensor depths for correlation of signals from each of the plurality of seismic sensors;
   in the computer, extrapolating the input seismic measurements to each depth increment in the range; and
   in the computer, determining a depth of each seismic sensor by correlating the seismic signal measurements with depth-extrapolated measurements of the seismic signal measurements.

2. The method of claim 1 wherein the range of sensor depths is defined using an initial estimate of sensor depths.

3. The method of claim 2 wherein the initial estimate is derived from measurements of a depth of each sensor in a body of water.

4. The method of claim 3 wherein the measurements of depth of each sensor comprises measurement of water pressure at each sensor.

5. The method of claim 3 further comprising quality checking the measured depths using the determined depths.

6. The method of claim 1 wherein the depth increment is selected to be consistent with a digital sample interval of the input seismic signal measurements.

7. The method of claim 1 wherein the extrapolating comprises delaying a measured wavefield so that the measured wavefield aligns with a ghost component of a wavefield of the seismic signal measurements.

8. The method of claim 7 wherein the delaying is performed with respect to seismic sensor depth.

9. The method of claim 1 wherein the correlating comprises a wave equation equivalent of autocorrelation.

10. The method of claim 1 wherein measurements of depths of each of the plurality of seismic sensors is made using measurements of water pressure.

11. The method of claim 1 further comprising, in the computer, determining at least one source depth using the depth-extrapolated measurements of the seismic signal measurements.

12. The method of claim 1 further comprising, in the computer, determining a depth of each seismic sensor by correlating primary reflections and water layer multiple reflections.

13. The method of claim 1 further comprising, in the computer, using the determined depths to deghost the measurements of seismic signals.

14. A method for seismic surveying, comprising:
towing a seismic energy source and a plurality of spaced apart seismic sensors in a body of water;
actuating the seismic energy source and detecting seismic signals at each of the plurality of seismic sensors;
communicating the detected seismic signals as input to a computer;
defining a depth increment and a range of sensor depths for correlation of the detected seismic signals from each of the plurality of seismic sensors;
in the computer, extrapolating the detected seismic signals to each depth increment in the range; and
in the computer, determining a depth of each of the plurality of seismic sensors by correlating the detected seismic signals with depth-extrapolated detected seismic signals.

15. The method of claim 14 wherein the depth increment is selected to be consistent with a digital sample interval of the detected seismic signals.

16. The method of claim 14 wherein the extrapolating comprises delaying a measured wavefield so that the measured wavefield aligns with a ghost component of a wavefield of the detected seismic signals.

17. The method of claim 16 wherein the delaying is performed with respect to seismic sensor depth.

18. The method of claim 14 wherein the correlating comprises a wave equation equivalent of autocorrelation.

19. The method of claim 14 wherein the range of sensor depths is defined using an initial estimate of sensor depths.

20. The method of claim 19 wherein the initial estimate is derived from measurements of a depth of each sensor in the body of water.

21. The method of claim 20 wherein the measurements of depth of each sensor comprises measurement of water pressure at each sensor.

22. The method of claim 20 further comprising using the determined depths to quality check the measured depths.

23. The method of claim 14 further comprising, in the computer, determining at least one source depth using the depth-extrapolated measurements of the seismic signal measurements.

24. The method of claim 14 further comprising, in the computer, determining a depth of each seismic sensor by correlating primary reflections and water layer multiple reflections.

25. The method of claim 14 further comprising, in the computer, using the determined depths to deghost the detected seismic signals.

* * * * *